United States Patent
Kreye et al.

(10) Patent No.: US 9,436,071 B2
(45) Date of Patent: Sep. 6, 2016

(54) METHOD FOR REDUCING A LIGHT INTENSITY OF A PROJECTION DEVICE

(71) Applicant: Robert Bosch GmbH, Stuttgart (DE)

(72) Inventors: Daniel Kreye, Reutlingen (DE); Frank Fischer, Gomaringen (DE); David Slogsnat, Tuebingen (DE); Ming Liu, Reutlingen (DE); Gael Pilard, Wankheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/396,662

(22) PCT Filed: Feb. 25, 2013

(86) PCT No.: PCT/EP2013/053690
§ 371 (c)(1),
(2) Date: Oct. 23, 2014

(87) PCT Pub. No.: WO2013/159950
PCT Pub. Date: Oct. 31, 2013

(65) Prior Publication Data
US 2015/0138167 A1 May 21, 2015

(30) Foreign Application Priority Data
Apr. 25, 2012 (DE) .......................... 10 2012 206 795

(51) Int. Cl.
*G06F 3/033* (2013.01)
*G03B 21/20* (2006.01)
*G03B 5/00* (2006.01)
*G03B 21/14* (2006.01)
*H04N 9/31* (2006.01)

(52) U.S. Cl.
CPC .............. *G03B 21/2053* (2013.01); *G03B 5/00* (2013.01); *G03B 21/147* (2013.01); *G03B 21/2086* (2013.01); *G06F 3/033* (2013.01); *H04N 9/3161* (2013.01); *H04N 9/3194* (2013.01); *G03B 2205/0007* (2013.01)

(58) Field of Classification Search
USPC .................................................. 345/157, 166
See application file for complete search history.

(56) References Cited

U.S. PATENT DOCUMENTS 6,460,999 B1 10/2002 Suzuki
2001/0005262 A1 6/2001 Tsurushima
(Continued)

FOREIGN PATENT DOCUMENTS

JP 2009 288498 12/2009

OTHER PUBLICATIONS

International Search Report for PCT/EP2013/053690, dated Nov. 5, 2013.

*Primary Examiner* — Long D Pham
(74) *Attorney, Agent, or Firm* — Norton Rose Fulbright US LLP

(57) ABSTRACT

A method for reducing a light intensity of a projection device is provided which includes the following steps: projecting information in the form of a visual representation onto a total area; emitting a plurality of electromagnetic signals which are essentially imperceptible to an observer onto the total area, using the projection device; detecting objects situated in the light path between the projection device and the total area with the aid of the electromagnetic signals; and reducing the light intensity of the projection device as long as an object is detected in the light path.

13 Claims, 5 Drawing Sheets

(56) References Cited

U.S. PATENT DOCUMENTS

| | | | |
|---|---|---|---|
| 2001/0028341 A1* | 10/2001 | Kitazawa | G06F 3/0425 345/156 |
| 2006/0146015 A1* | 7/2006 | Buchmann | G02B 26/0816 345/156 |
| 2009/0322676 A1* | 12/2009 | Kerr | G06F 3/0346 345/158 |
| 2010/0243858 A1 | 9/2010 | Newman et al. | |
| 2012/0318066 A1* | 12/2012 | Ichihara | A61B 5/0073 73/655 |

* cited by examiner

METHOD FOR REDUCING A LIGHT INTENSITY OF A PROJECTION DEVICE

BACKGROUND OF THE INVENTION

1. Field of the Invention

The present invention relates to a method for reducing a light intensity of a projection device, in particular for reducing a risk potential to an observer while operating a projection device, in particular a mobile projection device.

2. Description of the Related Art

So-called pico projection devices, also referred to as "projectors" for short or also "beamers," are known from the related art which are approximately the size of a pack of cigarettes, and which, when connected to a laptop computer, for example, or also as an integral part of an electronic device such as a smart phone, are used for projecting the screen content of the computer or information in general onto a wall surface.

Conventional projectors of this type operate according to the digital light processor (DLP) principle, the liquid crystal on silicon (LCoS) principle, or also as a scanning mirror laser projector. However, the exact mode of operation of these projectors is not discussed in greater detail here.

The conventional projectors share the common feature that the projected visual representation of the information occurs with essentially homogeneous illumination on a projection area. This has the disadvantage, on the one hand, that the available energy of the projector is distributed uniformly over all subareas of the projection area, although often, only one or a few subareas is/are relevant for an observer. This means that for nonrelevant subareas, energy in the form of, for example, light intensity or energy of the projector is unnecessarily consumed, and therefore the time for which the projector, which is generally operated independently of the power grid, i.e., using batteries, for example, is usable is reduced relatively sharply.

On the other hand, the homogeneous illumination of the projection area results in the disadvantage that the luminance of the projected representation may possibly be held at a relatively low total level for energy-saving reasons, resulting in only an unsatisfactory representation for the observer.

Often, the content of only one subarea of the projection area, i.e., approximately 10% to 50% of the total area, is relevant for the observer, at least for a certain period of time, such as for video clips, photo browsers, areas of an application window being processed at the moment for text documents, tables, or drawing programs. In this regard, large-format video presentations or slide shows, which utilize the entire projection area and are carried out using devices which are dependent on the power supply, are not considered, in contrast to the mobile applications discussed here.

In addition, for laser-based devices, due to existing eye safety guidelines the luminous flux emitted by the projector is limited to values which for a full-surface, homogeneously distributed representation likewise allow only unsatisfactory luminance of the projected representation to be achieved. The operation of projection devices which use relatively high-power laser light is perceived as unfavorable, since such laser light may be harmful to health if it strikes a human body, in particular the eyes.

BRIEF SUMMARY OF THE INVENTION

The present invention thus provides a method for reducing a light intensity of a projection device, which includes the following steps: projecting information in the form of a visual representation onto a total area; emitting a plurality of electromagnetic signals which are essentially imperceptible to an observer onto the total area, using the projection device; detecting objects situated in the light path between the projection device and the total area with the aid of the electromagnetic signals; and reducing the light intensity of the projection device as long as an object is detected in the light path.

The present invention provides a projection device which is suitable for operation using the method noted above.

According to one specific embodiment, the advantage of the method and the projection device results from the fact that a light intensity of a projection device which is laser-operated, for example, is reduced in the event that an object, such as a part of a human body for which the radiation emitted by the projection device could be harmful to health, is present in the light path of the projection, or projection path for short. This is advantageous in particular when, according to another specific embodiment, the light intensity is increased for at least one subarea which is relevant for the observer, so that the risk potential would also be correspondingly increased. However, due to the emission of test-like electromagnetic signals, the presence of an object in the projection path is detected, and the risk potential, i.e., the light intensity for the at least one relevant subarea, is correspondingly reduced as long as the object is present in the projection path.

The electromagnetic signals are preferably emitted along boundaries of the at least one subarea which is relevant, i.e., visually highlighted, which has the advantage that the signals, when light signals are involved, are not noticed by the observer.

It is preferred that the light signals are emitted in the form of pulses having a pulse length in the range of 0.2 ns to 100 ns, in particular between at least 20 pulses and 100 pulses maximum, at a frequency of 100 MHz to 500 MHz and having a length of 0.2 ns to 10 ns.

The step of changing the image representation ratio advantageously includes changing a light intensity ratio and/or a luminance ratio and/or a contrast ratio and/or a color density ratio and/or a gray scale ratio and/or an image sharpness ratio. Thus, when a subarea has been selected as relevant, the relevant subarea or information may be represented relatively brighter than the remainder via the luminance ratio of the relevant subarea to the remaining area, whereby the light intensity does not necessarily have to be increased with respect to the relevant subarea, but instead may remain constant, and the light intensity may be reduced only with respect to the nonrelevant areas.

Visual highlighting of a relevant subarea may also be achieved by changing a contrast ratio between relevant and nonrelevant areas, and likewise, by changing a color density ratio and/or a gray scale ratio and/or an image sharpness ratio.

It is also preferred that the step of selecting includes selecting the relevant subarea using a pointer device. A pointer device may be a laser pointer, for example, which is separate from the projection device, and which is used to point to a relevant subarea on the projection area, which is then visually highlighted relative to the remaining areas.

In addition, it is preferred that the step of selecting the relevant subarea includes a pointer device which is coupled to the projection device and/or to an electronic device which is connected to the projection device in a controllable manner. This may be a mouse pointer, for example, which is either directly coupled to the projection device or which is coupled to the projection device via an electronic device, such as an external computer, which is connected to the projection device. In the first case, the projection device may also be directly integrated into a smart phone, tablet PC, notebook or ultrabook, or some other computer-based device, whereby the pointer device may also be a touch-sensitive screen (touchscreen).

The step of selecting preferably includes selecting the relevant subarea manually, the selection taking place by briefly touching the relevant subarea with the hand or another object, in particular on the visually represented projection and/or by intervening in a projection path of the projection. A relevant subarea may thus be selected in a relatively simple manner.

A position of the projected visual representation relative to the total area preferably remains constant when the projection device moves. This is advantageous in particular for projection devices which are held in the hand of a user, in order to compensate for unavoidable fluctuations in movement. A movement of the projection device may be ascertained with the aid of one or multiple sensors, in particular acceleration sensors, rotation rate sensors, magnetic field sensors, optical sensors, distance sensors, and/or infrared sensors.

With regard to sensors, it is pointed out that the projection device may also include one or multiple sensors for determining a brightness of the surroundings in order to adapt values for light intensity and/or luminous flux, for example, to the brightness of the surroundings.

It is also preferred that the projection device is coupled to a pointer device for selecting the relevant subarea, a visual representation of the pointer device being projected onto the relevant subarea, and when the projection device moves, in contrast to relatively small fluctuations in movement, the position of the projected representation of the pointer device relative to the relevant subarea remains constant, or the position of the projected representation of the pointer device is changeable via the movement of the projection device in order to select a different subarea as relevant, using the pointer device.

It is also preferred that a user may optionally select a subarea as relevant with the aid of the pointer device. In this regard, the user may decide whether or not a subarea is to be visually highlighted, for example via a mouse click or in some other way that is controllable by the user.

Furthermore, it is preferred that when information is projected in the form of the visual representation onto the total area, the projection device emits control signals which are projected and distributed essentially uniformly over the total area, via which, when influenced by the step of selecting, a subarea associated with the corresponding control signals may be visually highlighted, i.e., made to appear as relevant. In this way, the projection device "knows" which subarea is selected as relevant at that moment in the manner of feedback, which is the case, for example, for a distance measuring device based on infrared or ultrasonic signals.

DETAILED DESCRIPTION OF THE INVENTION

Figure 1:
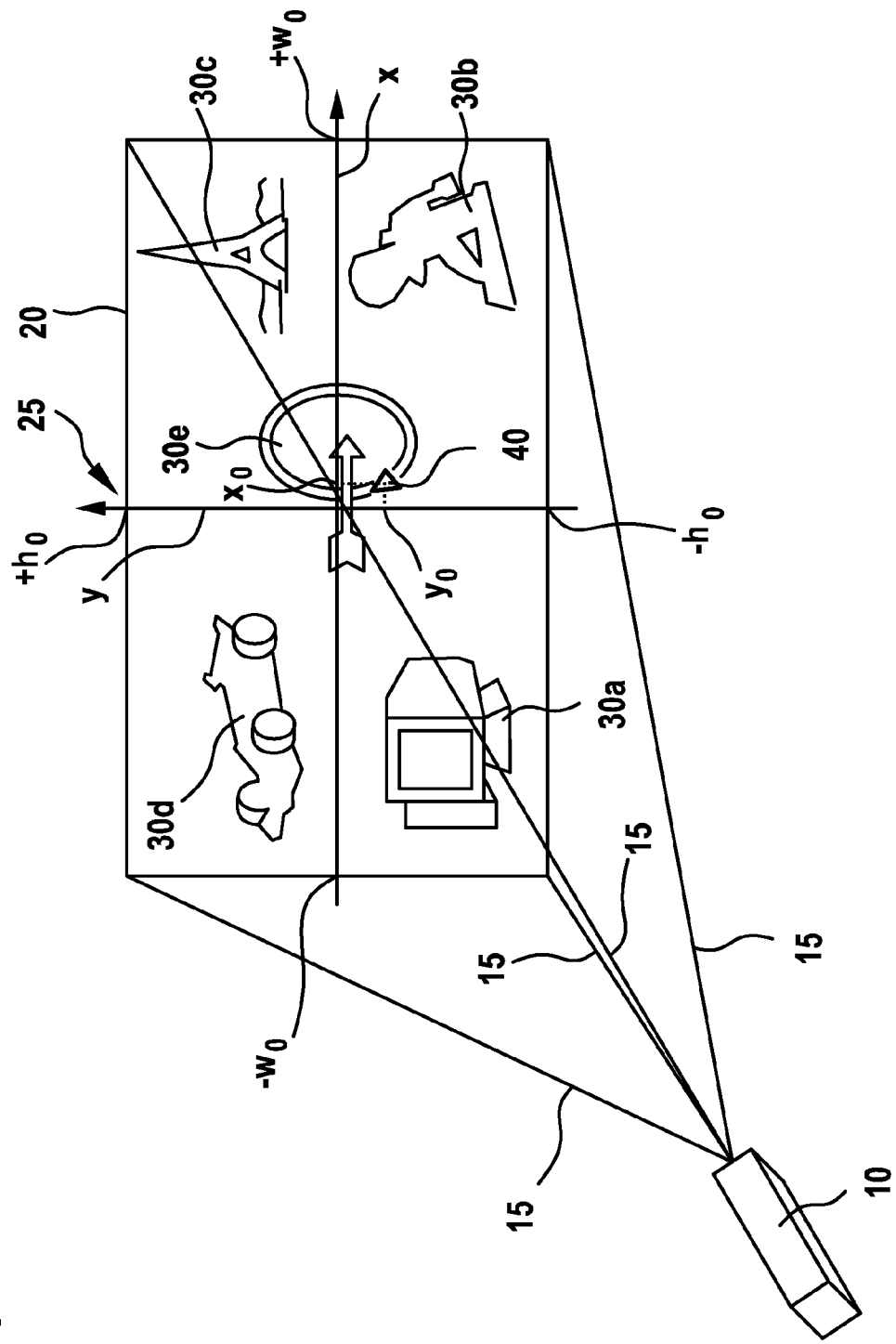
FIG. 1 shows a projection device according to one specific embodiment of the present invention, together with a projection area, having various pieces of information, which is emitted by the projection device.

FIG. 1 schematically shows a projection device 10 which is suitable for use of the method according to the present invention, explained in detail below.

In the example illustrated in FIG. 1, projection device 10 is a so-called pico projector or beamer which is shown as a stand-alone device having approximately the size of a pack of cigarettes. However, it is also conceivable for projection device 10 to be an integral part of (not illustrated here) a smart phone, a tablet PC, a notebook or ultrabook, a camcorder, a game console, a mobile image transmission device (a DVD player, for example), or some other mobile or also automotive device which in particular is also computer-based and/or Internet-capable.

Also illustrated in FIG. 1 is a projection area 20, to be referred to as a total area, which results when projection device 10 projects or visually represents information on a background, not described in greater detail. For better identification, four light paths 15 which extend to the corners of the projection area 20 are illustrated in FIG. 1.

For purposes of further explanation, a coordinate system 25 (which is not otherwise visible), composed of an axis designated as "X" and an axis designated as "Y," is plotted in the projection area 20. Thus, the extension of the projection area 20 may be expressed by $-w_0$ to $+w_0$ in terms of width, and by $+h_0$ to $-h_0$ in terms of height.

Various arbitrary contents 30a, 30b, 30c, 30d, 30e, which in the illustrated example are icons but which may also be application windows, control elements, etc., are illustrated on projection area 20.

Also illustrated on projection area 20 is a pointer device 40, depicted as an arrowhead, which has a fixed position relative to projection area 20, namely, a position denoted by $x_0$ and $y_0$ based on coordinate system 25. However, it is preferred that pointer device 40 is situated in the center of projection area 20.

Figure 2:
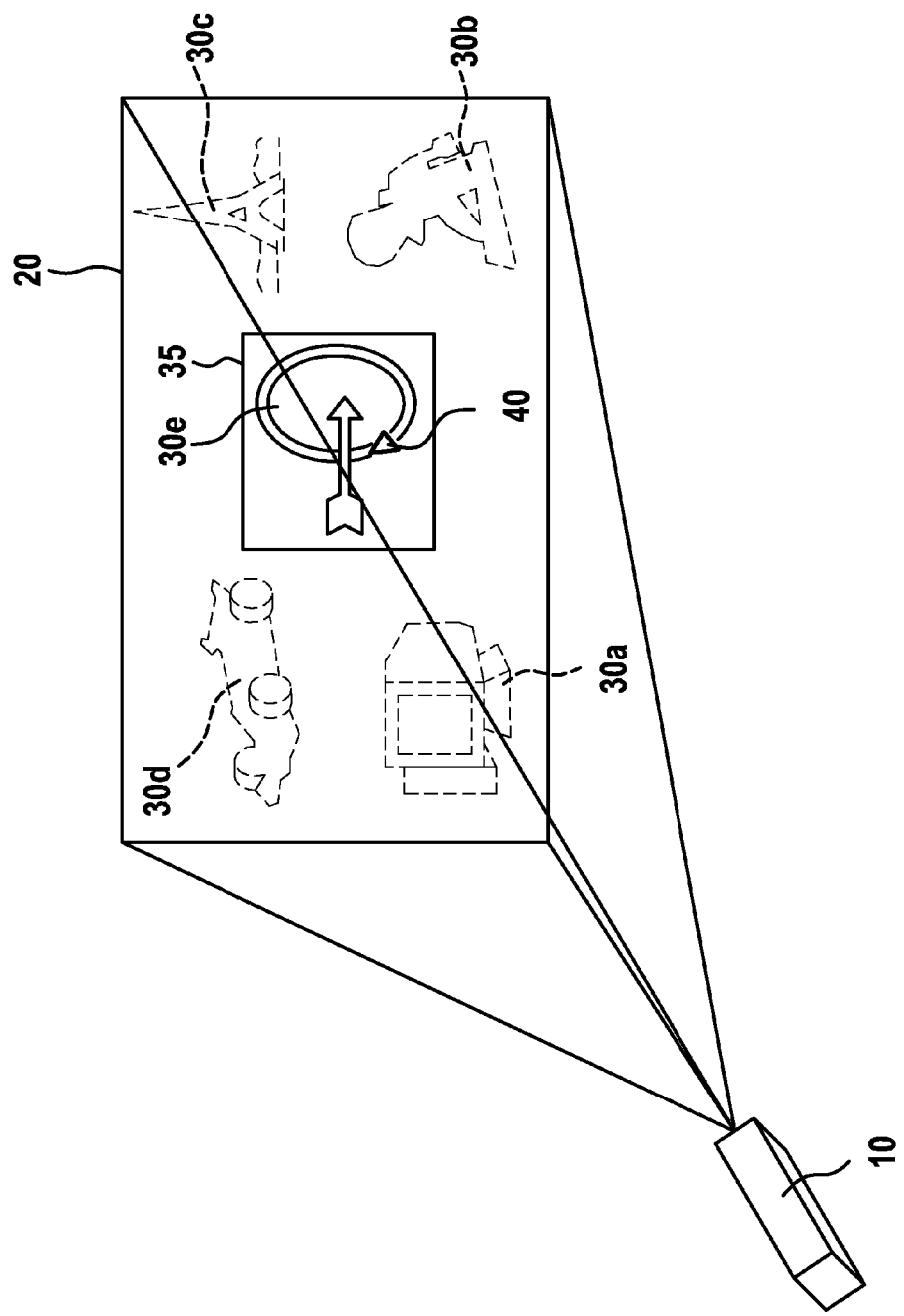
FIG. 2 shows a projection device according to one specific embodiment of the present invention together with a projection area, having various pieces of information, which is emitted by the projection device, a piece of information being visually highlighted.

FIG. 2 shows essentially the same illustration as in FIG. 1, i.e., a projection device 10 and a projection area 20 with icons 30a, 30b, 30c, 30d, 30e represented therein, and a pointer device 40. The only difference from FIG. 1 is that icon 30e is selected as relevant for the observer by pointer device 40, which is essentially illustrated on icon 30e. This means that remaining icons 30a, 30b, 30d, 30c are not relevant for the observer, and therefore are only indicated in dashed lines in FIG. 2.

In practice, this means that icon 30e, which, as mentioned above, may also be an application window, a text passage, a table, a video clip, etc., appears visually highlighted compared to the other icons 30a, 30b, 30d, 30c, since it is relevant for the observer. The visual highlighting is achieved by changing the image representation ratio of icon 30e, which is surrounded by a frame 35 in FIG. 2 and which thus forms a subarea, compared to the other icons 30a, 30b, 30d, 30c, by changing the luminance ratio of this subarea with respect to the remaining area. Either the luminance of the relevant subarea may remain constant and the luminance of the remaining nonrelevant area is decreased, or the luminance of the relevant subarea may be increased by increasing the light intensity for this subarea while the luminance of the remaining area remains constant.

The visual highlighting may also be achieved by changing a contrast ratio and/or a color density ratio and/or a gray scale ratio and/or an image sharpness ratio.

In addition, it is pointed out that a relevant subarea may also be selected by other means, which have been mentioned above.

FIG. 3 once again shows essentially the same illustration as FIGS. 1 and 2, but with the difference that actual projection area 20' is shifted relative to original projection area 20 (illustrated by dashed lines) by displacing or moving projection device 10, as indicated by a semicircular arrow 12. This displacement of the projection area from 20 to 20' is indicated by arrows 45.

Since pointer device 40 has also moved with the displacement of projection device 10, icon 30a is now selected or marked as relevant for the observer. For this reason, the other icons 30b, 30c, 30d, 30e are only indicated by dashed lines. Surface 50 illustrated in crosshatch, for which no image information is available, may remain completely dark, or may also be assigned any other color, brightness, or pattern. As mentioned above, the movement of projection device 10 may be detected by various sensors.

Figure 3:
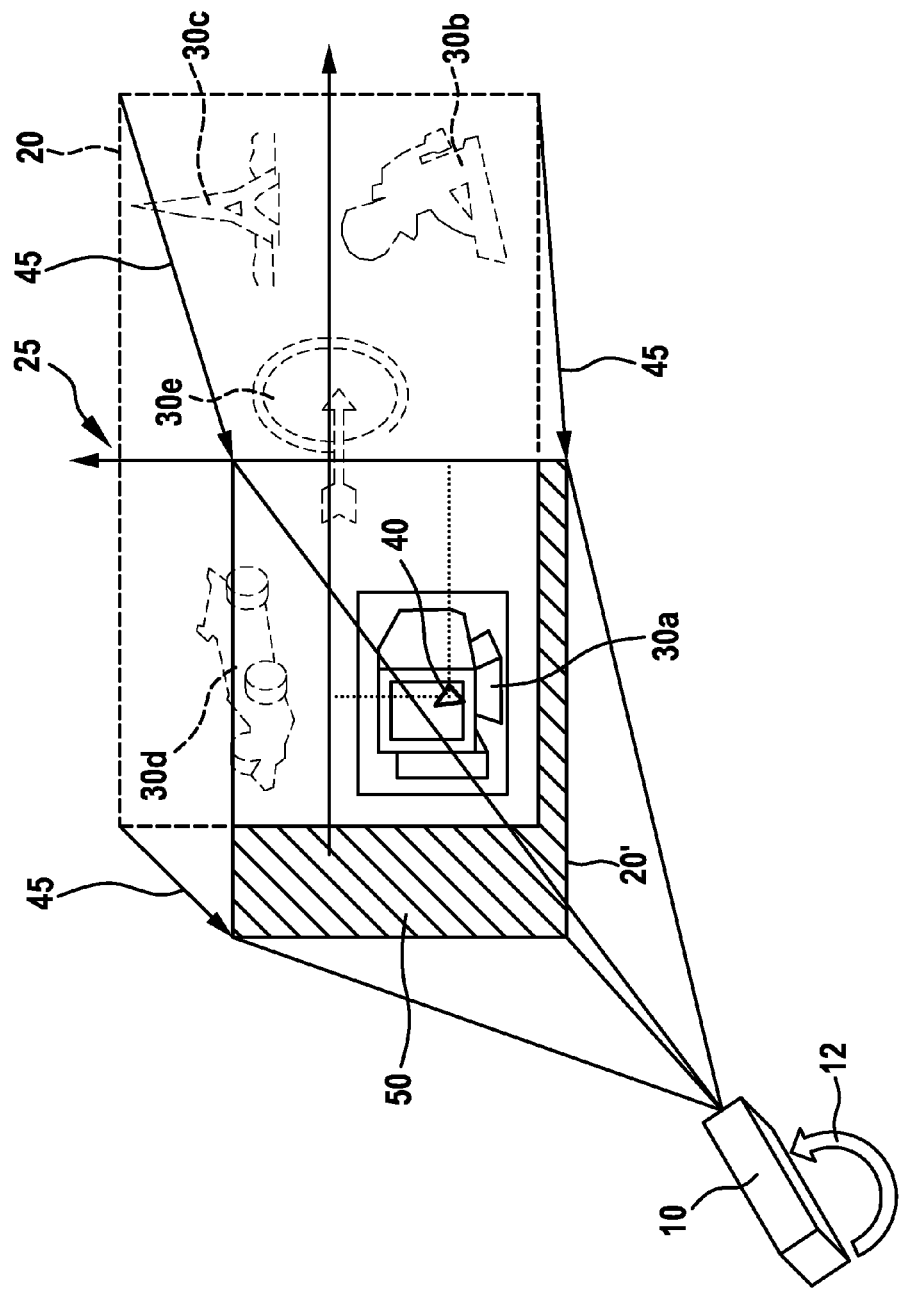
FIG. 3 shows a projection device according to one specific embodiment of the present invention together with a projection area, having various pieces of information, which is emitted by the projection device, a piece of information being visually highlighted while the projection device undergoes a movement.

Although in the example illustrated in FIG. 3, pointer device 40 moves together with projection device 10, i.e., the position of pointer device 40 remains constant relative to the boundaries of projection area 20', it is also conceivable for pointer device 40 to be moved in order to select an icon as relevant, while the projection area is not shifted.

Figure 4:
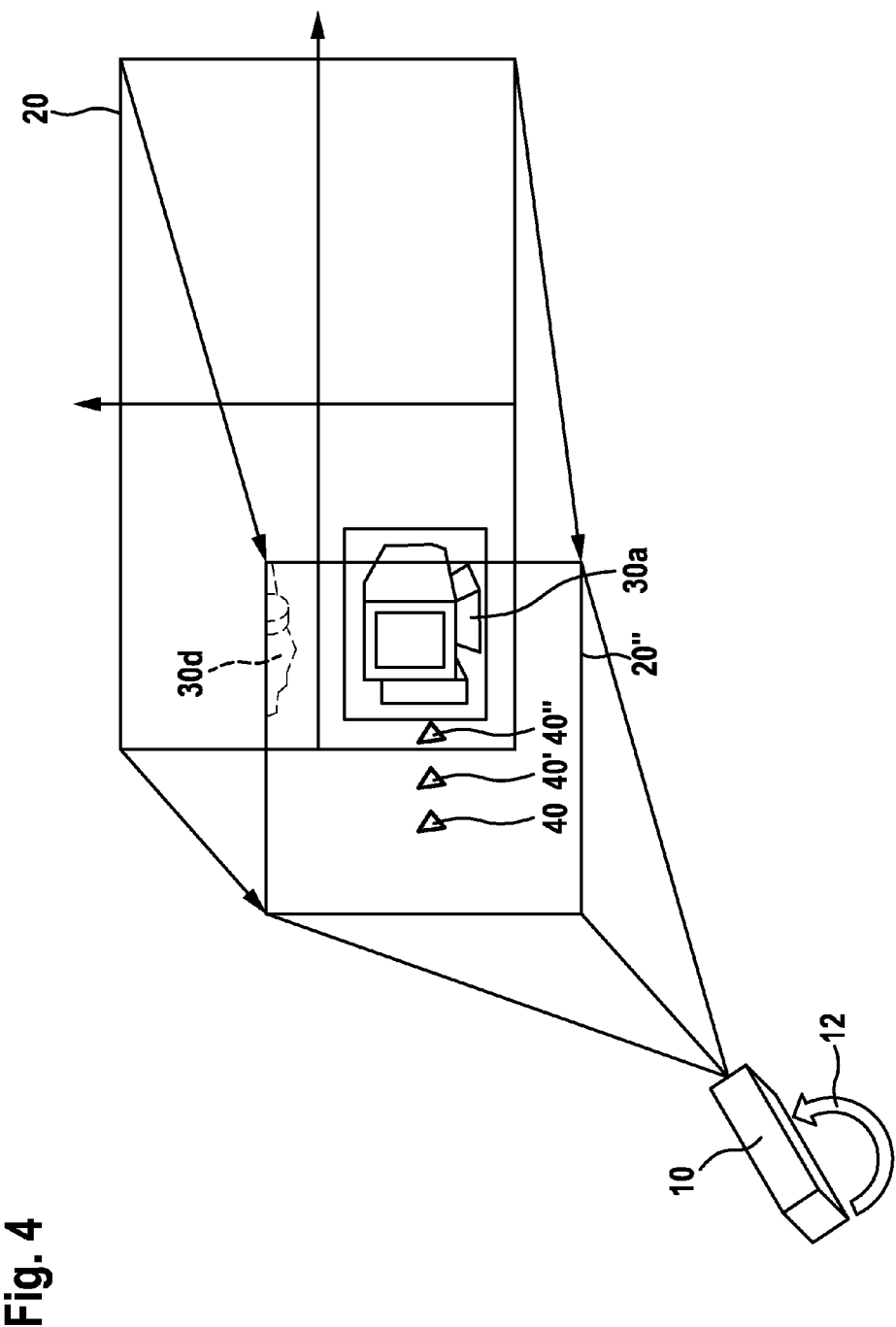
FIG. 4 shows a projection device according to one specific embodiment of the present invention together with a projection area, having various pieces of information, which is emitted by the projection device, a piece of information being visually highlighted while the projection device undergoes a movement beyond a boundary of the projection area.

FIG. 4 once again shows an illustration similar to that in FIG. 3; i.e., projection device 10 is moved, as indicated by an arrow 12. However, the movement of projection device 10 in FIG. 4 is such that pointer device 40 would be outside projection area 20, and therefore icon 30a would no longer be selected as relevant. In this case, the image content of icon 30a is displaced in a stepwise manner, as indicated by pointer devices 40' and 40", until pointer device 40" once again selects icon 30a as relevant.

A change in the light intensity, for example, may be made by a control signal which is provided in each case for each individual video pixel when the particular control signal transmits appropriate information that the light intensity is to be increased or changed for each pixel.

Figure 5:
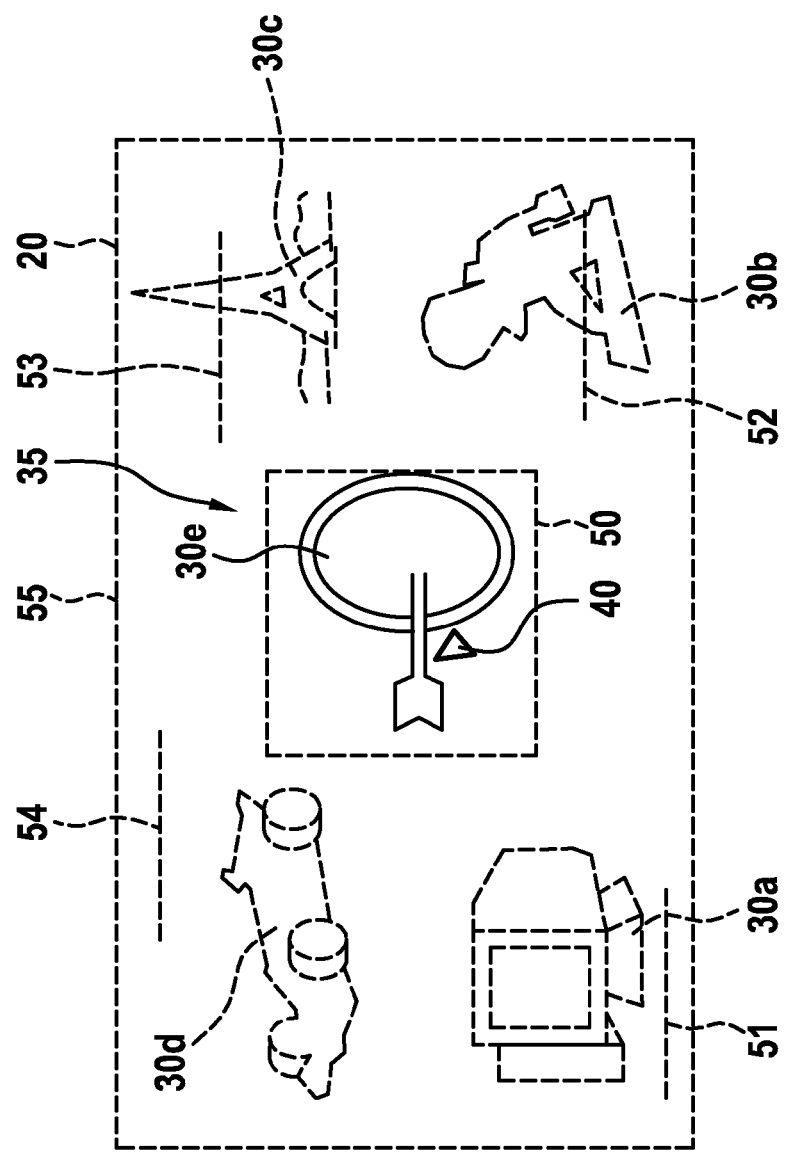
FIG. 5 shows a projection area with possible signals, in the form of dashed lines for detecting objects present in the projection path, illustrated thereon.

Lastly, FIG. 5 shows a projection area 20 as in FIG. 2, but without the projection device which generates the projection. Icons 30a, 30b, 30c, 30d, and 30e are once again apparent, with only icon 30e being visually highlighted as a subarea which is selected as relevant by a pointer device 40, while the other icons in each case are depicted as nonrelevant by a dashed outline.

Icon 30e, the same as in FIG. 2, is enclosed by a frame 35 (not illustrated here) for visually highlighting icon 30e. In contrast, the subarea with icon 30e is enclosed by a dashed-line boundary 50 which coincides with frame 35, each point on boundary 50 being intended to designate a position of a signal which strikes the projection area. The composition of these signals is such that they are not perceived by the observer. If an object such as a hand or a head is situated in the light path or projection path of one or more of the signals, a detection of an object is identified due to the interruption of the projection path of the signal(s) which are emitted from the projection device, and the light intensity, for example, for the relevant subarea is reduced to avoid a threat to an eye, for example, due to an excessively high light intensity. A detection of an object may be identified, for example, by a time-of-flight measurement or a phase shift method. However, other appropriate methods are also conceivable.

Alternatively or additionally, as illustrated in FIG. 2, appropriate test signals for detecting an object may also be projected at other locations on projection area 20, such as those illustrated by dashed lines 51, 52, 53, or 54. In addition, the boundary of total projection area 20 may be taken as the area for the test signals, as illustrated by a dashed line 55. However, any other area, which may also be situated outside projection area 20, is conceivable.

In conclusion, it is also pointed out that the distance of an object from the projection device may also be taken into account; i.e., an object situated at a relatively great distance from the projection device does not necessarily have to result in a reduction in a light intensity if it is established that, due to the further distance from the projection device, a threat to an irradiated observer, for example, is rather unlikely.

What is claimed is:

1. A method for reducing a light intensity of a projection device, comprising:
    projecting information in the form of a visual representation onto a total area;
    emitting, using the projection device, multiple electromagnetic signals which are essentially imperceptible to an observer onto the total area;
    detecting, with the aid of the electromagnetic signals, the presence of an object situated in the light path between the projection device and the total area; and
    reducing the light intensity of the projection device if an object is detected in the light path, wherein:
        the multiple electromagnetic signals are emitted within the boundary of the total area;
        at least one subarea, which is relevant for an observer within the total area of the visually represented information, is user selectable; and
        when at least one relevant subarea is selected, the multiple electromagnetic signals are emitted within the boundaries of the at least one selected relevant subarea.

2. The method as recited in claim 1, comprising:
    changing an image representation ratio of the selected at least one relevant subarea to the remaining area within the total area onto which the visual representation is projected such that the image representation of the at least one relevant-subarea is visually highlighted in comparison to the remaining area.

3. The method as recited in claim 2, wherein the electromagnetic signals are light signals.

4. The method as recited in claim 3, wherein the light signals are emitted in the form of pulses having a pulse length in the range of 0.2 ns to 100 ns.

5. The method as recited in claim 2, wherein the step of changing the image representation ratio includes changing at least one of a light intensity ratio, a luminance ratio, a contrast ratio, a color density ratio, a gray scale ratio, and an image sharpness ratio.

6. The method as recited in claim 5, wherein the step of selecting includes selecting the relevant subarea using an electronic pointer device.

7. The method as recited in claim 6, wherein for the step of selecting the relevant subarea, the pointer device is coupled to at least one of (i) the projection device and (ii) an electronic device which is connected to the projection device in a controllable manner.

8. The method as recited in claim 5, wherein the step of selecting includes selecting the relevant subarea manually, the selection taking place by at least one of (i) briefly touching the relevant subarea on the visually represented projection and (ii) by intervening in a projection path of the projection.

9. The method as recited in claim 5, wherein a position of the projected visual representation relative to the total area remains constant when the projection device moves.

10. The method as recited in claim 9, wherein the movement of the projection device is ascertained with the aid of at least one of an acceleration sensor, a rotation rate sensor, a magnetic field sensor, an optical sensor, a distance sensor, and an infrared sensor.

11. The method as recited in claim 10, wherein the projection device is coupled to a pointer device for selecting the relevant subarea, a visual representation of the pointer device being projected onto the relevant subarea, and when the projection device moves, one of (i) the position of the projected representation of the pointer device relative to the relevant subarea remains constant, or (ii) the position of the projected representation of the pointer device is changeable via the movement of the projection device in order to select a different subarea as relevant.

12. The method as recited in claim 11, wherein a user is able to select a subarea as relevant with the aid of the pointer device.

13. The method as recited in claim 5, wherein when information is projected in the form of the visual representation onto the total area, the projection device emits control signals which are projected and distributed essentially uniformly over the total area, via which, when influenced by the step of selecting, a subarea associated with the corresponding control signals is visually highlighted.

* * * * *